(No Model.)
P. O'BRIEN.
Ice House.
No. 237,768. Patented Feb. 15, 1881.
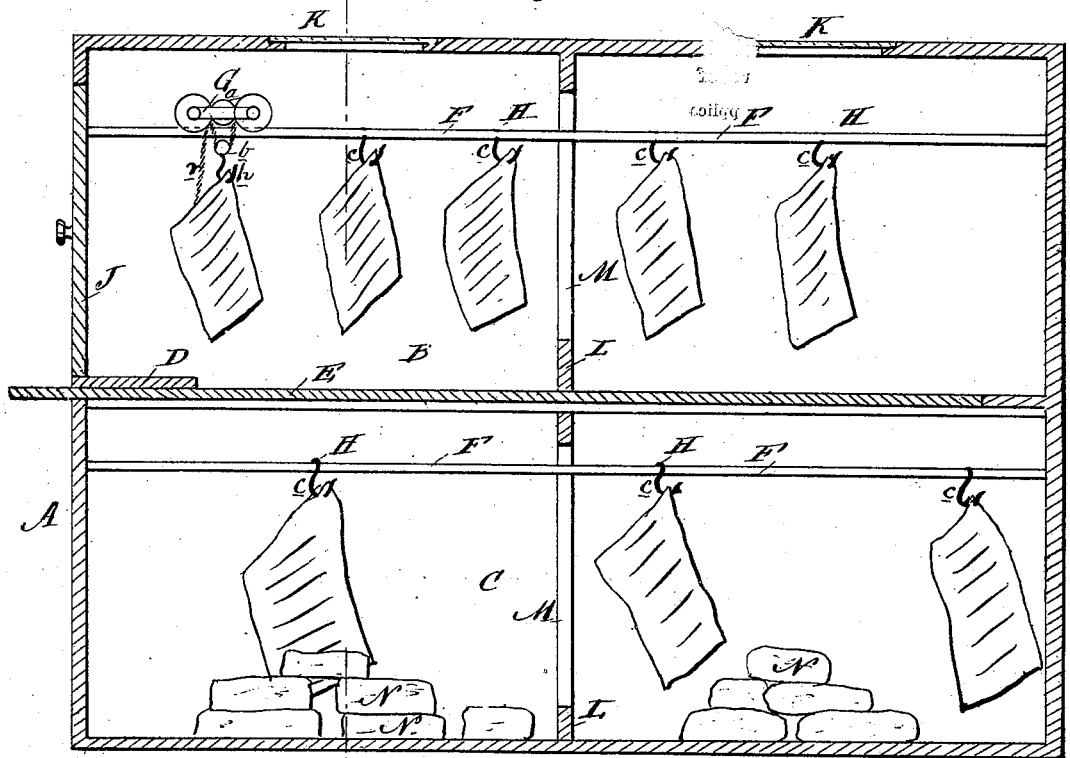
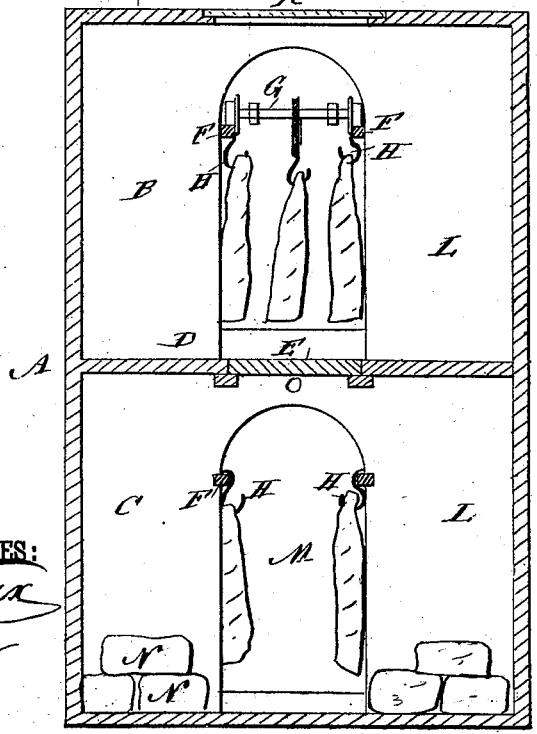
WITNESSES:
INVENTOR:
P. O'Brien
BY Munn & Co
ATTORNEYS.

UNITED STATES PATENT OFFICE.

PATRICK O'BRIEN, OF NEW YORK, N. Y.

ICE-HOUSE.

SPECIFICATION forming part of Letters Patent No. 237,768, dated February 15, 1881.

Application filed May 25, 1880. (No model.)

*To all whom it may concern:*

Be it known that I, PATRICK O'BRIEN, of the city, county, and State of New York, have invented a new and Improved Ice-House, of which the following is a specification.

The object of my invention is to provide a new and improved ice-house for cooling and preserving meat and other substances in a simple and effective manner.

The invention consists of an ice-house subdivided by a floor provided with a longitudinal opening, closed by a sliding or other door, into an upper cooling-compartment and a lower freezing or preserving one, each compartment being provided with two parallel rails running longitudinally through said compartment, one set of rails lying directly over the other and over the opening in the floor separating the compartments, both tracks being provided with hooks for suspending the meat, and the upper track being provided with a truck having a roller journaled in its frame, and blocks and tackles, and hooks on which the meat is suspended, by means of which the meat may be conveyed to any desired point on the upper track, and lowered through the opening in the floor into the lower compartment, and suspended on hooks in the lower compartment, as hereinafter more fully set forth, and pointed out in the claim.

In the accompanying drawings, Figure 1 is a central longitudinal sectional elevation of my improved ice-house, and Fig. 2 is a cross-sectional elevation of the same on the line $x\,x$, Fig. 1.

Similar letters of reference indicate corresponding parts.

The ice-house A is subdivided into an upper compartment, B, and a lower compartment, C, by a floor, D, provided with a central longitudinal opening, O, closed by means of a sliding door, E. Both the upper compartment, B, and the lower compartment, C, are provided with longitudinal bars or rails F, upon which the carriage G, for transporting the pieces of meat, runs.

The hooks H, by means of which the pieces of meat are suspended, are hooked into the rails.

The lower compartment, C, is entirely closed; but the upper compartment, B, is provided with a door, J, and one or more top windows, K K.

If the ice-house is very large, it may be subdivided by a series of partitions, L, provided with suitable openings, M, to admit the carriage G and persons attending to the meat to pass.

The ice N is placed in the lower compartment, C, and may be piled up on the floor or against the sides of the lower chamber, C.

The meat, as it arrives from the slaughter-house, is taken into the upper compartment, B, and is suspended therein for a time varying from four to eight hours, the sliding door E and the outer door, J, being closed during this time. The sliding door E is then drawn outward, and the meat suspended by the hooks $c$ on the rails in the upper compartment transferred to the hooks $h$, secured to the pulleys $b$, connected with the roller $a$, journaled in the frame of the truck by the ropes $r$, and the meat, carried by the truck over the point in the lower compartment, where it is desired to hang it, is lowered by the blocks and tackles into the lower compartment and suspended therein, when the sliding door E is closed. The meat remains in the lower compartment until it is to be used.

In the within-described ice-house the meat is cooled gradually, and the serious injury to the meat caused by taking it from the slaughter-house directly into an ice-cold room is avoided, and consequently the meat is much more wholesome and delicate than that treated according to the old methods.

The sliding door E may be replaced by a trap-door or like other suitable device.

I am aware that it is common for butchers and others to lower meat and other articles by means of ropes and pulleys into ice-wells to cool and preserve the meat, and I therefore lay no claim thereto, my invention being confined to the construction of parts whereby meat in the upper compartment may be quickly and readily conveyed by rail opposite any part of the lower compartment, in which it is desired to suspend the meat, and applying to the truck conveying said meat pulleys and ropes, whereby the meat may be readily lowered into the lower compartment, as pointed out in the claim.

Having thus described my invention, I claim as new and desire to secure by Letters Patent—

The ice-house A, subdivided into two compartments, B C, by the floor D, having an opening, O, closed by the door E, each compartment being provided with the longitudinal rails F, having hooks $c$ secured thereto, and one set of rails lying directly over the other set and in line with the opening in the floor, and truck G, provided with the roller $a$, pulleys $b$, having hooks $h$, and ropes $r$, the whole constructed, arranged, and operated in the manner and for the purpose set forth.

PATRICK O'BRIEN.

Witnesses:
 OSCAR F. GUNZ,
 C. SEDGWICK.